United States Patent [19]
Jean Beguin et al.

[11] Patent Number: 5,827,342
[45] Date of Patent: Oct. 27, 1998

[54] TREATMENT OF GLASS SUBSTRATES TO COMPENSATE FOR WARPAGE AND DISTORTION

[75] Inventors: Alain Marcel Jean Beguin, Vulaines Sur Seine, France; Heather Boek; Richard Orr Maschmeyer, both of Corning, N.Y.; Denis M. Trouchet, Quincy Sous Senart, France

[73] Assignee: Corning Incorporated, Corning, N.Y.

[21] Appl. No.: 834,517

[22] Filed: Apr. 4, 1997

Related U.S. Application Data

[60] Provisional application No. 60/017,001, Apr. 30, 1996.

[51] Int. Cl.$^6$ .......................... C03C 17/00; C03C 25/02; C03B 23/00; C03B 21/00
[52] U.S. Cl. ............................. 65/60.5; 65/60.53; 65/64; 65/102; 65/DIG. 8; 427/108; 427/126.2
[58] Field of Search .................... 65/60.5, 60.53, 65/64, 102, DIG. 8; 427/126.2, 108

[56] References Cited

U.S. PATENT DOCUMENTS

| | | |
|---|---|---|
| 4,501,602 | 2/1985 | Miller et al. . |
| 5,043,002 | 8/1991 | Dobbins et al. . |
| 5,152,819 | 10/1992 | Blackwell et al. . |
| 5,154,744 | 10/1992 | Blackwell et al. . |
| 5,261,022 | 11/1993 | Sun et al. . |
| 5,378,256 | 1/1995 | Green et al. ............................. 65/395 |
| 5,483,613 | 1/1996 | Bruce et al. . |
| 5,556,442 | 9/1996 | Kanamori et al. ........................ 65/17.4 |

FOREIGN PATENT DOCUMENTS

| | | |
|---|---|---|
| 0 146 659 | 12/1983 | European Pat. Off. . |
| 304709 A2 | 8/1988 | European Pat. Off. . |
| 0 535 861 | 4/1993 | European Pat. Off. . |
| 0 545 432 | 6/1993 | European Pat. Off. . |
| 575157 A1 | 6/1993 | European Pat. Off. . |
| 0 697 605 A2 | 8/1995 | European Pat. Off. . |
| 0751 408 | 1/1997 | European Pat. Off. . |
| 4433738 A1 | 9/1994 | Germany . |
| 60-90838 | 5/1985 | Japan . |
| 60-180338 | 6/1985 | Japan . |
| 2 245 553 | 3/1990 | United Kingdom . |
| WO 90/10596 | 3/1990 | WIPO . |

OTHER PUBLICATIONS

Polarisation–Insensitive Arrayed–Waveguide Grating Multiplexer with $SiO_2$–on–$SiO_2$ Structureby S. Suzuki et al. in Electronics Letters, Apr. 19, 1994, vol. 30, No. 8, pp. 642–643.

Suzuki, S. et al. "Polarisation–insensitive arrayed–waveguide grating multiplexer with SiO2–on–SiO2 structure" Electronics Letters, 14 Apr. 1994, vol. 30 No. 8 pp. 642–643.

*Primary Examiner*—Peter Chin
*Assistant Examiner*—Jacqueline A. Ruller
*Attorney, Agent, or Firm*—William Greener, Esq.

[57] ABSTRACT

A method for forming a substantially flat planar lightwave optical circuit which has a substantially flat planar silica substrate and a sintered glassy lightguiding layer over the silica substrate. The structure is given a post treatment at an elevated temperature for a time sufficient to flatten said structure and overcome any distortion caused by the difference in the coefficient of thermal expansion of the substrate and any glassy layers formed over the substrate. Alternatively, the silica substrate may be heated and presagged to a predetermined degree to compensate for distortion or warpage which will occur in later processing.

8 Claims, 2 Drawing Sheets

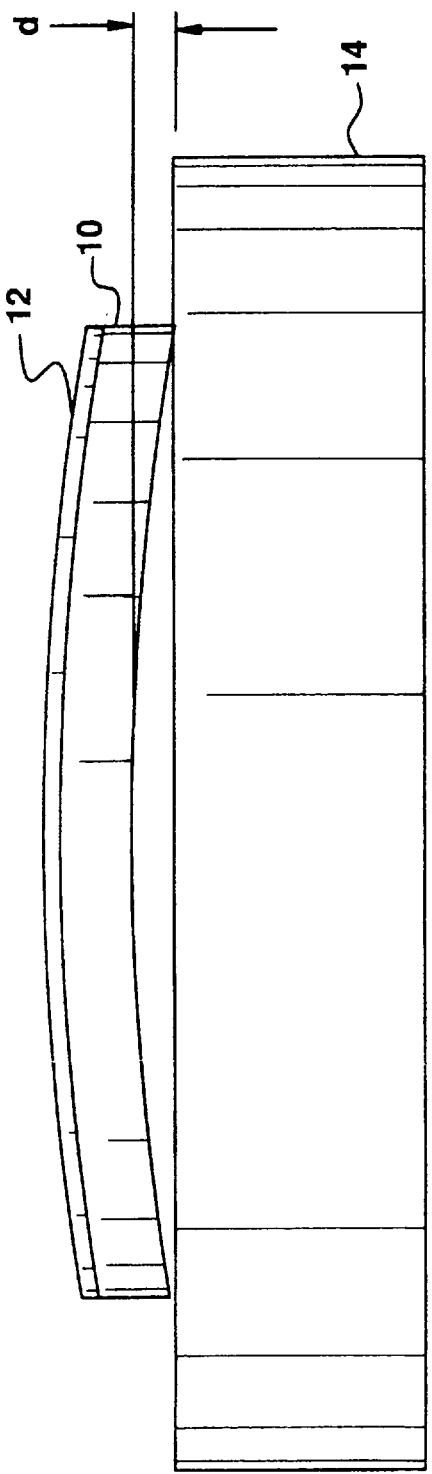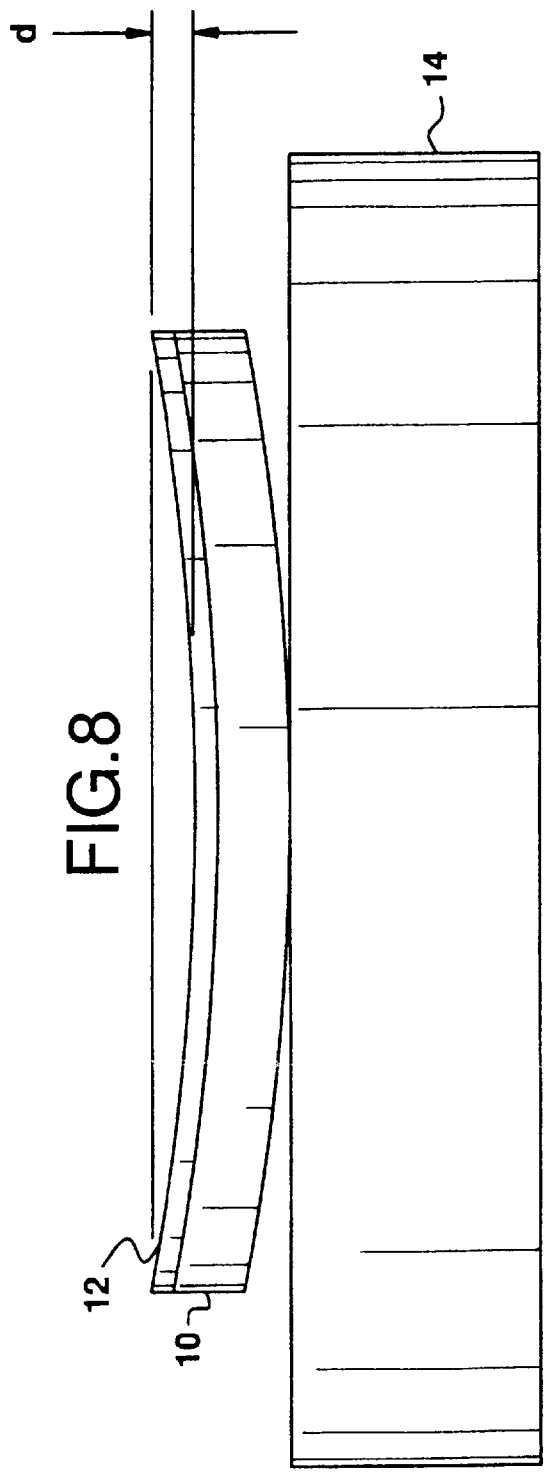

TREATMENT OF GLASS SUBSTRATES TO COMPENSATE FOR WARPAGE AND DISTORTION

CROSS REFERENCE TO RELATED APPLICATION

Reference is made to a priority claimed from U.S. Provisional Application Ser. No 60/017,00 filed Apr. 30, 1996, entitled "Treatment of Glass Substrates To Compensate For Warpage and Distortion".

BACKGROUND OF THE INVENTION

The present invention relates in general to a method of treating substrates to compensate for warpage, and more specifically to a method for compensating for warpage in multilayered optical and electronic devices having a plurality of overlaying glass layers which are sealed together.

Stress is generated when two glasses that have different coefficients of thermal expansion (CTEs) are sealed together. For example, planar waveguiding glass layers are formed on silica substrates in order to make Lightwave Optical Circuits (LOC). The CTE differences between the silica and the waveguiding layer, and between this layer and an overclad layer can cause the substrate to deform unacceptably. Furthermore, the pattern of the waveguides can influence the shape of the substrate. A warped substrate can lead to poor resolution during subsequent photolithography and etching steps, or could contribute to losses by deforming or bending waveguides and degrade other optical properties.

This problem with respect to warpage caused by glass layers having different CTEs in composite layered optical and electronic structures has not been addressed to any significant extent or solved by the art. One of the few published articles which addressed this problem is the article *Polarisation-Insensitive Arrayed-Waveguide Grating Multiplexer with $SiO_2$-on-$SiO_s$ Structure* by S. Suzuki et al. in Electronics Letters, Apr. 14, 1994, Vol. 30, No. 8, pgs. 642643. In the Suzuki et al. article, it was suggested that an approach to solving this problem was to substitute Si for $SiO_2$ as the substrate in order to be able to use a higher consolidation temperature and consolidate without substrate deformation or warpage. This approach is rather limiting and does not solve the problem when $SiO_2$ must be used as the substrate.

It can therefore be seen from the above that in forming composite glass structures, such as planar waveguiding glass layers for use as optical circuits, that the approach suggested by S. Suzuki et al. severely limits of process and materials options available to the manufacturer of planar optical and electronic devices having multiple layers of different glass layers which are sealed together.

In another prior art teaching in EPO patent application EP 0 697 605 A2 "Optical Device with Substrate and Waveguide Structure Having Thermal Matching Interfaces", Applicants teach an optical device and waveguide structure having matched thermal interfaces which are accomplished by attempting to match the substrate and waveguiding layer coefficients of thermal expansion by doping each layer appropriately. This approach would appear to be costly and require additional time consuming processing.

It is therefore an objective of the present invention to provide a process for treating glass substrates to overcome the distortion and warpage problems of the prior art described above.

SUMMARY OF THE INVENTION

The present invention is directed to the treatment of substrates to compensate for warpage which results in eventual distortion in optical and electrical properties in planar devices of the type having two or more glasses which are sealed together, and which have different coefficients of thermal expansion (CTEs).

In one embodiment of the present invention, a planar waveguiding glass layer is formed on a silica substrate in order to make a Lightwave Optical Circuit (LOC). The CTE differences between the silica, the waveguiding layer, and the top overclad glass layer can cause the substrate to deform unacceptably. In addition, the formation of the circuit or pattern of the waveguides can also influence the shape of the substrate.

In one embodiment of the present invention, a post-heat treatment is carried out to correct warpage caused by the formation of the waveguiding glass layer on the silica substrate. In this embodiment, the silica substrate containing the waveguiding glass layer is heated on a smooth flat surface in an oxygen free or ambient atmosphere, depending upon the support plate used, at a temperature between the annealing temperature and the softening point of the silica layer for a time sufficient to allow the warped substrate to flatten.

In an alternative embodiment, an uncoated silica substrate is preheated or sagged in order to compensate for warping which predictably will occur during the formation of the sintered waveguiding layer on the silica substrate.

A further embodiment of the first embodiment described above, involves heat treatment following the overcladding of the glassy waveguiding layer following conventional photolithography and etching steps which form the appropriate circuit on the waveguiding layer. Conventional photolithography and etching techniques are well known to the art. The book *Semiconductor Lithography Principles, Practices and Materials* by W. M. Moreau, Plenum Press, 1988, teaches suitable procedures which can be used, and is incorporated herein by reference.

BRIEF DESCRIPTION OF THE DRAWINGS

For a fuller understanding of the nature and objects of the invention, reference should be made to the following detailed description of a preferred mode of practicing the invention, read in connection with the accompanying drawings, in which:

FIG. 7 is an enlarged view of FIG. 2.

FIG. 8 is an enlarged view of FIG. 3.

DETAILED DESCRIPTION OF THE INVENTION

Post Heat-Treatment

The substrates suitable for use in the present invention are also known as wafers or disks for the waveguiding glass layers, and are made from silica ($SiO_2$). They are typically right cylinders with a 10 cm diameter and 1 mm thickness. The substrate top and bottom surfaces are flat (typically <5

μm over 10 cm) and highly polished with beveled edges. The 5 μm deviation is the roughness total or the greatest deviation from a perfectly flat surface. A light waveguiding layer typically 5–7 μm (microns) thick is formed on the substrate by first forming an oxide soot layer by flame hydrolysis followed by sintering the soot layer to form an oxide glass layer over the substrate. The waveguiding or core glass layers in one embodiment were within the quaternary $GeO_2$—$B_2O_3$—$P_2O_5$—$SiO_2$ to achieve a high percent delta. It should be understood that any suitable conventional glass composition may be used to make the waveguiding glass layer.

U.S. Pat. Nos. 5,043,002 and 5,154,744 illustrate conventional methods of flame hydrolysis and firing or sintering which can be used to form the glass waveguiding layers on the silica substrate, and are incorporated herein by reference. The waveguiding layers can also be formed by other conventional techniques such as plasma enhanced CVD; low pressure CVD; electron beam deposition and ion exchange technology which are readily available in the art.

In one embodiment of the present invention flat silica substrates made from high purity fused quartz 10 cm in diameter, and 1 mm thick, available from General Electric under the designation GE 124 were used. A soot layer of 13.9% $GeO_2$, 3.4% $B_2O_3$, 1.4% $P_2O_5$ and 81.3% $SiO_2$ (all in wt. %) was formed on the silica substrate by flame hydrolysis. The oxide soot layer was then sintered at 1290° C. to form a glass layer about 5–7 microns thick. Three additional samples were made by the same method. It should be understood that any other suitable silica substrates can be used. For example, silica substrates made from high purity fused quartz from Corning, Inc. under Codes 7980 and 7940 could also be used. When a complete device is made, following forming the circuit by conventional techniques described above, the etched device is then overclad with a glass layer having an index of refraction which matches the silica substrate. For this application, a suitable cladding glass composition comprises 8.6% $B_2O_3$, 4.6% $P_2O_5$ and 86.8% $SiO_2$ (all wt. %).

Figure 3:
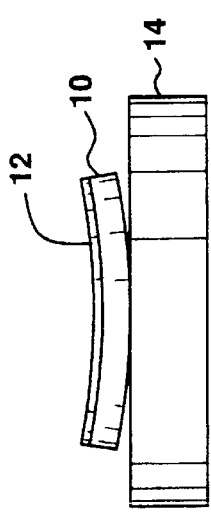
FIG. 3 illustrates a side view of a second coated substrate which is treated by the present invention.
Figure 2:
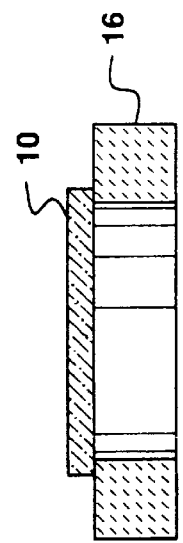
FIG. 2 illustrates a side view of a coated substrate which is treated by the present invention.
Figure 4:
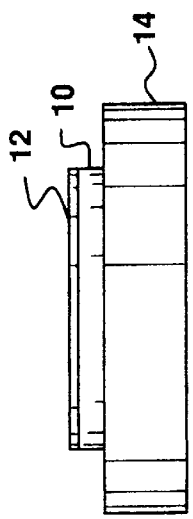
FIG. 4 illustrates a side view of a coated substrate which has been treated by the present invention.

As illustrated in FIGS. 2 and 3, the silica substrates 10 containing the sintered glass layers 12 formed as described above, warped upwardly or downwardly as shown in FIGS. 2 and 3, respectively. The maximum height or distance d of warpage for each sample was measured and recorded. This distance d is illustrated in FIGS. 7 and 8 which are enlarged views of FIGS. 2 and 3, respectively.

Figure 1:
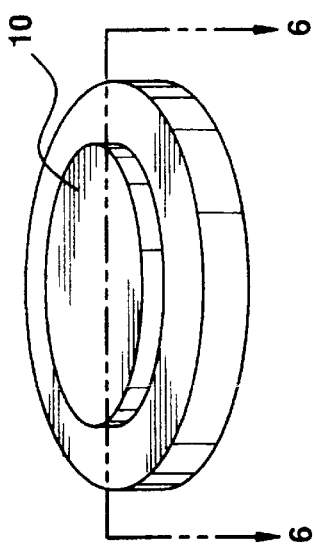
FIG. 1 illustrates measurement traces taken across substrate samples of the present invention.

The warpage was measured with a Taylor-Hobson profilometer. Three traces were taken across each sample (A to B, C to D, E to F); the traces were taken edge-to-edge and are illustrated diagrammatically in FIG. 1 of the drawings.

The four samples are then given a thermal treatment which is hot enough to deform the substrate, but cool enough to avoid damaging the glass layers. A suitable temperature range for this treatment is between about 1200° to 1300° C. for about 15 min. to 7 hours. The samples are heating to the treatment temperature at about 10–17 deg. C./min., and after treatment are cooled at a rate of about 17 deg. C./min. The substrate or wafer is supported on a support plate which is made of glassy carbon; this material is polished to be extremely flat (at least as flat as the silica substrate). The graphite plate requires an oxygen-free firing atmosphere. A temperature of 1290° C. for 1 hour was found to be suitable for this combination of materials. Other heat treatment conditions might be required for glass layers having different compositions and configurations.

The following are examples of 4 coated wafers described above that have been heat treated (HT at 1290° C. for 1 hour in He) on a graphite plate. Three traces were taken across each sample (A-B, C-D, E-F). (See FIG. 1). The data in the table are in microns for warpage d before and after treatment.

TABLE 1

|  | A-B | C-D | E-F | mean |
|---|---|---|---|---|
| Example 1 | | | | |
| Initial | 166.0 | 146.2 | 134.6 | 148.9 |
| After HT | 37.0 | 29.6 | 64.1 | 43.6 |
| Example 2 | | | | |
| Initial | 132.8 | 126.9 | 125.8 | 128.5 |
| After HT | 39.0 | 42.5 | 54.2 | 45.2 |
| Example 3 | | | | |
| Initial | 130.3 | 132.5 | 121.4 | 128.1 |
| After HT | 51.1 | 34.0 | 42.2 | 42.4 |
| Example 4 | | | | |
| Initial | 127.8 | 137.9 | 127.6 | 131.1 |
| After HT | 23.5 | 42.4 | 49.7 | 38.5 |

As can be seen from the data above, these samples have been flattened successfully to within a target range of about 40 microns which is a nominal tolerable maximum of distortion for optical applications and processes. Depending upon the match-up or closeness of the CTE of the various glass layers, i.e., substrate, lightguiding layer and cladding, or the effect of the formation of the circuit or pattern on the substrate, the timing of the heat treatment step may vary depending upon when correction is required. For example, a single heat treatment step to flatten the substrate may occur after formation of the lightwave guiding glass; after etching to form the optical circuit; or after cladding. Optionally, more than one heating step may take place if unacceptable warpage to the substrate occurs after more than one process step.

Figure 5:
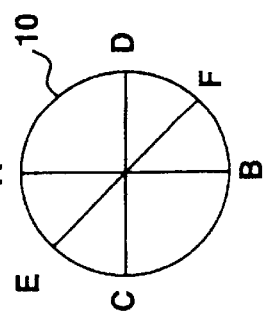
FIG. 5 illustrates a perspective view of an uncoated substrate to be treated by the present invention.
Figure 6:
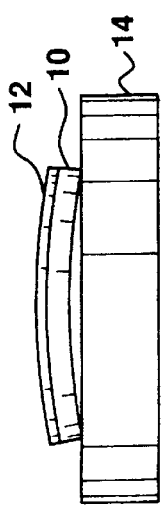
FIG. 6 is a view of FIG. 5 along line 6—16.

In another embodiment, uncoated silica wafers (GE 124) have been treated while resting on a silica ring 16. (See FIGS. 5 and 6). The heat treatments consisted of heating up from room temperature to a top temperature of 1210° C. at about 10–17 deg. C./min., holding for a given time at that top temperature, and cooling at the furnace rate which is typically about 17 deg. C./min. The substrates were traced for flatness before and after the heat treatment. Three traces were taken across each sample (A-B, C-D, E-F). The data for warpage d are in microns.

TABLE 2

| Heat Treatment | | A-B | C-D | E-F | mean |
|---|---|---|---|---|---|
| | Example 1 | | | | |
| 1200 deg. C./0.5 hr. | Initial | 0.3 | 1.4 | .8 | 0.8 |
| | After HT | 19.4 | 5.7 | 10.9 | 12.0 |
| | Example 2 | | | | |
| 1200 deg. C./0.75 hr. | Initial | 0.6 | 0.3 | 0.8 | 0.6 |
| | After HT | 0.8 | 23.3 | 1.3 | 8.5 |
| | Example 3 | | | | |
| 1210 deg. C./0.5 hr. | Initial | 1.4 | 0.9 | 1.1 | 1.1 |
| | After HT | 19.7 | 4.4 | 12.1 | 12.1 |

The substrates repeatedly sagged (downwardly) during these heat treatments, but the magnitude of the warpage is small. The above data demonstrates that these samples can then be used in soot deposition/consolidation in that this initial warpage can compensate for the stress generated by the sintered glass layers later formed on the silica substrate.

Although the preferred application of the present invention is directed to silica ($SiO_2$) substrates, it should be understood that it may also be applicable to other substrates such as silicon (Si) and sapphire ($Al_2O_3$).

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A method for forming a substantially flat planar lightwave optical circuit which comprises:

a. providing a silica substrate;

b. forming a layer of a plurality of oxide compounds on said substrate;

c. sintering said oxide layer to form a glassy lightguiding layer over said silica substrate;

d. forming an optical circuit into said glassy layer by conventional photolithography and etching;

e. heating the structure formed in step (d) above to an elevated temperature for a time sufficient to flatten said structure to a final warpage of about 40 microns or less; and f. cladding the surface formed in step (e) above with an overlaying glass layer having an index of refraction substantially equal to that of the substrate.

2. A method for forming a substantially flat planar lightwave optical circuit structure which comprises:

a. providing a silica substrate;

b. forming a layer of a plurality of oxide compounds on said substrate;

c. sintering said oxide layer to form a glassy lightguiding layer over said silica substrate;

d. heating the structure formed in (c) above to an elevated temperature for a time sufficient to flatten said structure to a final warpage of about 40 microns or less;

e. forming an optical circuit into said glassy layer by conventional photolithography and etching; and f. cladding the surface formed in step (e) above with an overlaying glass layer having an index of refraction substantially equal to that of the substrate.

3. A method for forming a substantially flat planar lightwave optical circuit structure which comprises:

a. providing a silica substrate;

b. forming a layer of a plurality of oxide compounds on said substrate;

c. sintering said oxide layer to form a glassy lightguiding layer over said silica substrate;

d. forming an optical circuit into said glassy layer by conventional photolithography and etching;

e. cladding the surface formed in step (d) above with an overlaying glass layer having an index of refraction substantially equal to that of the substrate; and f. heating the structure formed in step (e) to an elevated temperature for a time sufficient to flatten said structure to a warpage of about 40 microns or less.

4. The method of claim 1 in which the heating step (e) is repeated after step (f).

5. The method of claim 2 in which the structure is supported on a flat graphite support during the heating step (d).

6. The method of claim 2 in which the oxide layer of step (b) is first formed as an oxide soot.

7. The method of claim 6 in which the soot comprises a mixture of $GeO_2$—$B_2O_3$—$P_2O_5$—$SiO_2$.

8. The method of claim 2 in which the substrate comprises a circular wafer.

* * * * *